UNITED STATES PATENT OFFICE.

ANDREW McDOUGALL, OF GOFFSTOWN, NEW HAMPSHIRE.

IMPROVEMENT IN MEDICAL COMPOUNDS OR OINTMENTS FOR HORSES' HOOFS.

Specification forming part of Letters Patent No. 130,229, dated August 6, 1872.

*To all whom it may concern:*

Be it known that I, ANDREW McDOUGALL, of Goffstown, in the county of Hillsborough and State of New Hampshire, have invented or produced a new and useful Hoof-Ointment for the alleviation and cure of diseases incident to the feet of horses; and I do hereby declare the constituents thereof and the mode of compounding and using the same to be fully set forth in the following specification.

This ointment consists of the following ingredients: Crude turpentine, (either of the white or yellow pine,) beef's marrow or its equivalent, and honey. The proportions employed in making the compound, and which I have found by long experiment to attain the best results, are, equal parts, by weight, of the turpentine and marrow, and one-half part of honey. These proportions, however, may be somewhat varied, and still be productive of beneficial effects. These substances I put into a kettle and melt or simmer together until all the aqueous matter is eliminated, frequently stirring the same until all the elements are thoroughly intermingled. This having been effected, the whole is removed from the fire, and when partially cooled it is strained, when it is ready for use.

In using the same it is to be applied to the hoof or the diseased part thereof by means of a brush, and should be applied two or three times a week, or oftener, if desirable, until the hoof has attained its normal condition.

I claim—

The above-described compound, composed of the ingredients and in the proportions substantially as and for the purpose set forth.

ANDREW McDOUGALL.

Witnesses:
F. P. HALE,
F. C. HALE.